United States Patent
Avila

(10) Patent No.: US 6,866,089 B2
(45) Date of Patent: Mar. 15, 2005

(54) LEAK DETECTION WITH THERMAL IMAGING

(75) Inventor: Luis F. Avila, Manlius, NY (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 10/189,101

(22) Filed: Jul. 2, 2002

(65) Prior Publication Data

US 2004/0003914 A1 Jan. 8, 2004

(51) Int. Cl.$^7$ .............................................. G01B 3/04
(52) U.S. Cl. ............................ 165/11.1; 62/149; 73/40; 73/40.5 R; 73/40.7
(58) Field of Search ................................ 165/11.1, 121, 165/70, 76; 62/298, 149; 73/37, 40.5 A, 40.7, 24.01, 24.02, 592, 601, 49.7, 40, 46

(56) References Cited

U.S. PATENT DOCUMENTS

| | | | |
|---|---|---|---|
| 4,314,577 A | * 2/1982 | Brister | 137/13 |
| 4,382,379 A | * 5/1983 | Kelly | 73/46 |
| 4,467,635 A | * 8/1984 | Dahmen et al. | 73/40.5 R |
| 4,468,948 A | * 9/1984 | Nakayama | 73/19.1 |
| 4,555,627 A | * 11/1985 | McRae, Jr. | 250/334 |
| 4,772,789 A | * 9/1988 | Maram et al. | 250/330 |
| 4,783,988 A | * 11/1988 | Bao et al. | 73/46 |
| 4,864,829 A | * 9/1989 | Manning et al. | 62/85 |
| 4,913,558 A | * 4/1990 | Wettervik et al. | 73/40.5 R |
| 4,920,785 A | * 5/1990 | Etess | 73/40.7 |
| 4,922,999 A | * 5/1990 | Stokes et al. | 165/286 |
| 5,001,346 A | * 3/1991 | Barkhoudarian | 250/330 |
| 5,161,408 A | * 11/1992 | McRae et al. | 73/40.7 |
| 5,306,913 A | * 4/1994 | Noack et al. | 250/338.5 |
| 5,307,643 A | * 5/1994 | Beckerman | 62/77 |
| 5,351,500 A | * 10/1994 | Morrow | 62/129 |
| 5,367,885 A | * 11/1994 | Sagar | 62/125 |
| 5,430,293 A | * 7/1995 | Sato et al. | 250/330 |
| 5,438,862 A | * 8/1995 | Keating et al. | 73/49.2 |
| 5,457,528 A | * 10/1995 | Tobias | 73/61.48 |
| 5,523,569 A | * 6/1996 | Hornfeld et al. | 250/330 |
| 5,524,445 A | * 6/1996 | Morrow et al. | 62/129 |
| 5,529,605 A | * 6/1996 | Mussig et al. | 75/670 |
| 5,542,256 A | * 8/1996 | Batey et al. | 62/610 |
| 5,560,220 A | * 10/1996 | Cochran | 62/260 |
| 5,600,057 A | * 2/1997 | Hansche et al. | 73/40.7 |
| 5,656,813 A | * 8/1997 | Moore et al. | 250/330 |
| 5,780,724 A | * 7/1998 | Olender et al. | 73/40.5 A |
| 5,835,976 A | * 11/1998 | Kent et al. | 73/40.7 |
| 5,859,363 A | * 1/1999 | Gouge | 73/40.7 |
| 5,872,308 A | * 2/1999 | Bowling | 73/40 |
| 6,009,745 A | * 1/2000 | Shaw et al. | 73/40.7 |
| 6,035,700 A | * 3/2000 | Shaw | 73/40.7 |
| 6,227,036 B1 | * 5/2001 | Yonak et al. | 73/40.5 A |
| 6,314,794 B1 | * 11/2001 | Seigeot | 73/40.7 |

* cited by examiner

Primary Examiner—Ljiljana Ciric
(74) Attorney, Agent, or Firm—Wall Marjama & Bilinski LLP

(57) ABSTRACT

An infrared camera is used to detect leakages in a heat exchanger by an imaging process that indicates temperature differences between a heat exchanger and a pressurized gas therein. The temperature differences are created by cooling or heating either the pressurized gas or the heat exchanger, and any leakages are visually observable by the resultant image which is representative of the temperature differences. The process can be accomplished with the use of ambient air rather than the commonly used trace gases which are less desirable because of economical and environmental reasons.

18 Claims, 3 Drawing Sheets

LEAK DETECTION WITH THERMAL IMAGING

BACKGROUND OF THE INVENTION

This invention relates generally to heat exchangers for air conditioning systems and, more particularly, to a method and apparatus for leak testing of heat exchangers to be charged with refrigerant.

There are many different ways of testing the integrity of a coil or heat exchanger used in residential, commercial or industrial air conditioning and heating systems, but all of them require the use of a trace gas and a surrounding matrix against which escape of the trace gas is detectable either visibly or by the use of instruments. Such trace gases, ranging from refrigerants to inert gases, are used either to pressurize the component prior to leak detection of the outer geometry of the part or forming a surrounding environment on the component itself while the latter is subject to internal vacuum.

The cost of the testing process is dictated not only on the original equipment initial costs, but on the cost of use of the trace gas in itself. The very nature of this approach imposes a potential impact on the factory environment due to the escape of gas and non-contained leakage points.

Trace gas escapes to the factory environment are greatly undesirable not only because they represent waste in terms of cost (non recyclable nor reusable gas emissions), but also because of the increasing environmental codes and regulation in all the major HVAC regions of the world including North, Central and South America, and particularly in Asia and Europe.

Another variation of the trace gas systems is the so called "Air under Water" process, very common in today's HVAC industry because of its relative simplicity. This process uses the principle of pressurizing the heat exchanger or coil with air to a specific design pressure, capping the heat exchanger so that it will maintain the pressure, and then submerging the component in clear water to detect leaking hole size and location by visual inspection of the air bubbles. This process has the disadvantage of also producing water emissions. As of now, there are very few testing systems that are "clean" and emission free.

Thermal imaging systems work on the principle that all bodies have a given amount of radiation of heat depending on their actual surface temperature, surrounding energy sources (i.e. light, heat, etc . . . ), surface conditions and physical properties of the material that they are made of. A special infra-red camera device adjusted to work on the infra-red light spectrum frequency range is able to detect the different temperature gradient areas or zones on the body surface. This video image is then fed to a computer for imaging processing, so that it can graphically display the temperature distribution on a screen for analysis and interpretation. Thermal imaging systems are commercially available with different detection sensitivities for use in diverse ways in the medical and industrial fields, such as insulated steam pipe leak/breakage point location for maintenance work, main water underground pipe leaks, medical body scans, etc . . .

It is therefore an object of the present invention to provide an improved method and apparatus for leak testing of heat exchanger coils.

Another object of the present invention is the provision for a leak testing method which reduces the occurrence of introducing trace gases to the environment.

Yet another object of the present invention is the provision for reducing the waste that results from loss of trace gases during leak testing.

Still another object of the present invention is the provision for a heat exchanger leak testing process that is efficient and effective in use.

These objects and other features and advantages become more readily apparent upon reference to the following description when taken in conjunction with the appended drawings.

SUMMARY OF THE INVENTION

Briefly, in accordance with one aspect of the invention, the heat exchanger to be tested is pressurized, and either the heat exchanger or the pressurizing vapor is heated or cooled so as to create a significant temperature gradient between the heat exchanger and the pressurized vapor. An infrared camera is then used to create an image of the heat exchanger as representative of both the temperature of a heat exchanger and the temperature of any gas that is leaking therefrom. The images can then be analyzed to locate and fix any leaks in the heat exchanger.

In accordance with another aspect of the invention, the heat exchanger is pressurized with ambient air, such that the cost of trace gases that are otherwise used, are eliminated, as well as the need to flush the heat exchanger after testing.

By another aspect of the invention, the temperature gradient between the heat exchanger and the contained vapor is obtained by heating or cooling the air that is pumped into the heat exchanger. The gradient may be increased by oppositely cooling or heating the heat exchanger.

By yet another aspect of the invention, a black body is placed behind the coil to prevent the reflection of light that would otherwise introduce errors into the imaging process.

By still another aspect of the invention, the infrared camera may be applied to generate representative signals which are processed for generating input and feedback signals to peripheral equipment for the purpose of improving quality control.

In the drawings as hereinafter described, a preferred embodiment is depicted; however various other modifications and alternate constructions can be made thereto without departing from the true spirit and scope of the invention.

DESCRIPTION OF THE PREFERRED EMBODIMENT

Figure 1:
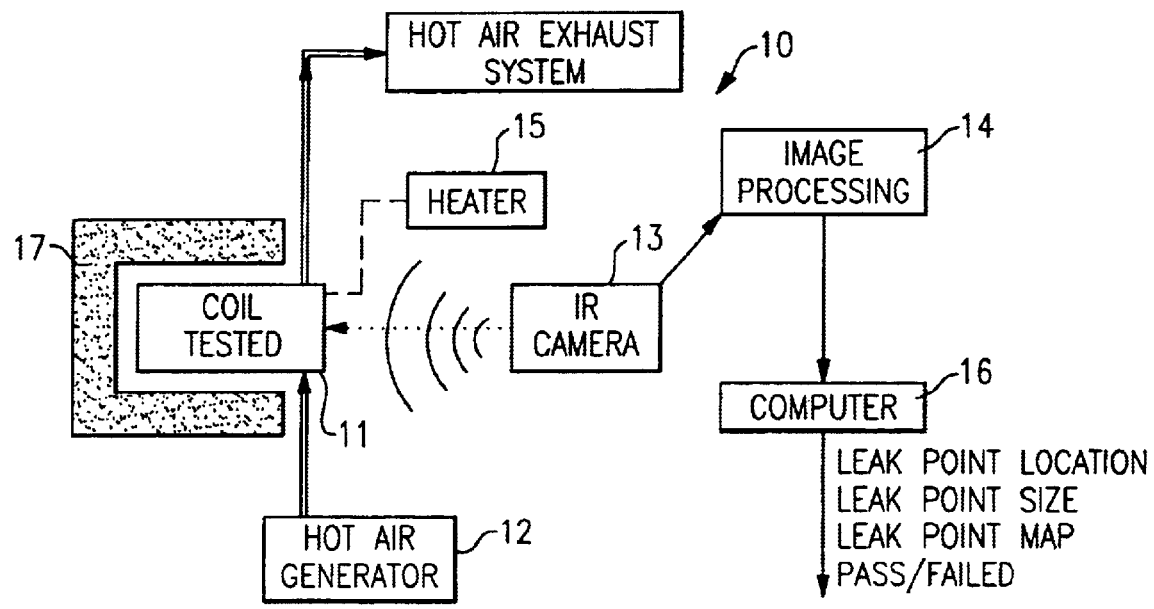
FIG. 1 is a schematic illustration of the leak testing apparatus in accordance with the preferred embodiment of the invention.

Referring now to FIG. 1, the invention is shown generally at 10 as applied to a heat exchanger or coil 11 to be tested. The coil 11 is pressurized by a compressor or pump indicated generally in FIG. 1 as a hot air generator 12 to a relatively low pressure such as 5 psi, for example. A preferred gas medium is ambient air.

An infra-red camera 13 is set up in the vicinity of the coil 11 such that it can detect any leakage from the coil 11 by the temperature difference between the coil 11 and the escaping vapor. In order to expose the various locations of possible leakage from the coil 11, it will generally be necessary to move either the coil 11 or the camera 13. If the coil is moved, the camera 13 can remain stationary while a programmed fixture can be made to automatically move the coil 11 to the various positions that will enable the camera 13 to be aimed at the possible areas of leakage. In the alternative, the coil 11 may remain stationary, with the camera 13 being moved in a programmed manner to effectively sweep the heat exchanger surfaces to scan for possible leaks.

Figures 1, 3:
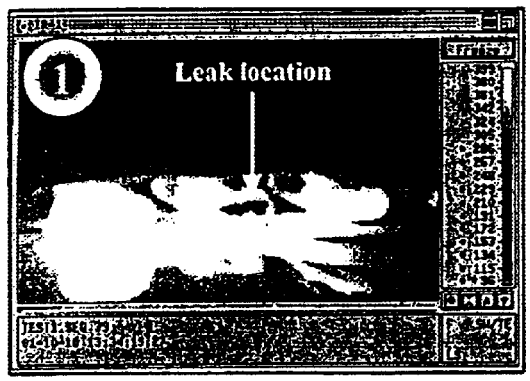
FIG. 3 is a pictorial illustration of the stages of transition as the leak detection process occurs.
Figures 2, 3:
Figure 3:

After the infra-red camera 13 has sensed the different temperature gradient areas or zones on the heat exchanger 11 caused by of the leakage of the hot air in the vicinity of the cooler coil surfaces, the resultant signals are sent to an image processor 14 and then to a computer 16 for the generation of a graphic display of the temperature distribution. Such a graphic display as shown in FIG. 3 can then be analyzed and interpreted in a manner to be described more fully hereinafter.

Keep in mind that, while it is imperative with the present system that there be a temperature difference between the leaking gas and the surrounding surface of the coil, those relative temperatures can be accommodated in any of a number ways. One approach is to simply introduce the hot air into the relatively cool coil and to allow the coil to be slowly heated up by the hot air in a transient manner. With this approach, it is necessary to calibrate the system to recognize the relative temperature relationship with changes of time. That is, the coil 11 will tend to be heated up by the hot air, and the hot air will tend to be cooled down by the coil 11. Thus, when the temperature difference between the two is finally recorded by the camera 13, the degree of heating/cooling of the two mediums must be taken into consideration for the proper display and analysis of the test results.

Another factor that must be considered in the calibration of the system is the fact that there will be some cooling of the escaping leaked gas simply because of the expansion process that occurs with the leakage from the pressurized container.

Figure 2:
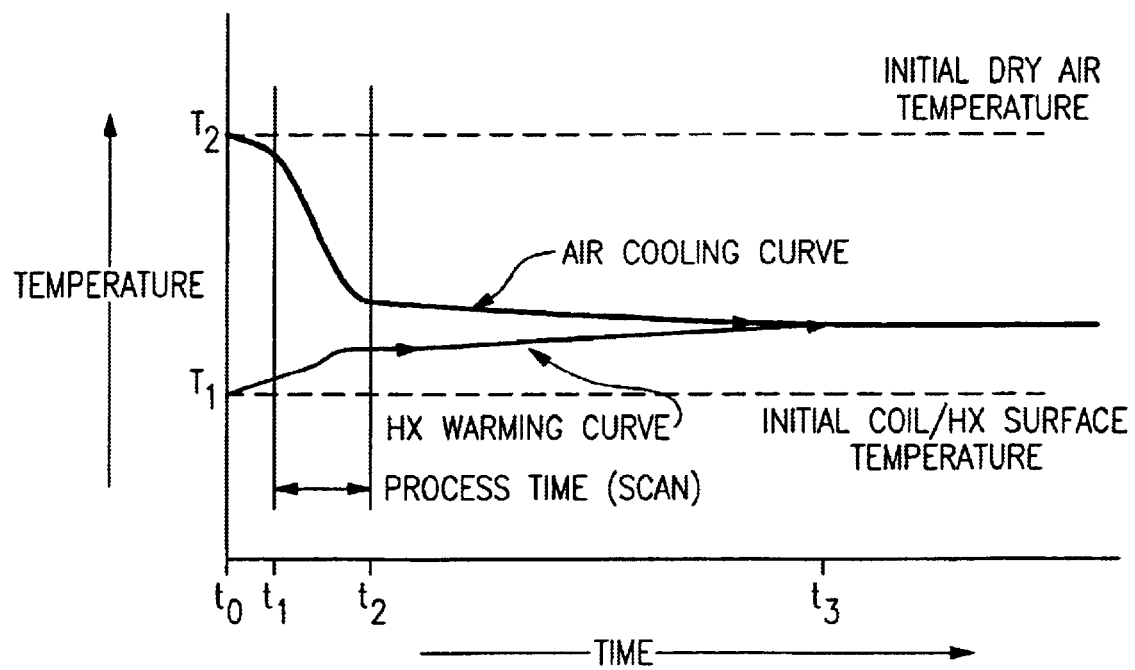
FIG. 2 is a graphic illustration of the operational parameters for thermal image leak detection on heat exchangers.

The relative temperature relationship is shown in FIG. 2 wherein the temperature of each of the coil 11 and that of the air is shown as a function of time. There, it is will be seen that if time equals $t_0$, the temperature differences are greatest, and at time $t_3$, they are equal and no meaningful data can be obtained. Further, at time equals $t_2$ the temperature gradient is quite small and the representative imaging and analysis would be difficult. Accordingly, it is desirable to obtain the data as quickly as possible after $t_0$. Thus, a typical process scan would occur, preferably, between $t_1$ and $t_2$ as shown. Again, the analysis of the resulting image of such transient operation will be more fully described with reference to FIG. 3 hereinafter.

Rather then operating on a transient basis as described hereinabove, it is also possible to maintain the coil 11 at a constant ambient temperature by the use of forced convective air or the like. While this adds an extra step, as well as the need for additional equipment, it does simplify the analysis because of the coil 11 remaining at the temperature $t_1$ throughout the test. Of course, there are still transient aspects to this approach since the hot air within the coil 11 will tend to be cooled by the substantially cooler surface of the coil 11.

Rather then using hot air and a cool coil, the arrangement may be reversed. That is, the heat exchanger or coil 11 may be heated by a heater 15 to a higher temperature, with the pressurizing air being at ambient or at some other cooler temperature. In doing this, one approach would be to simply heat up the heat exchanger first, and then inject the cooler gas, with each temperature being allowed to drift toward the other in a transient manner as discussed hereinabove. In the alternative, additional heat may be added to the heat exchanger in order to maintain a constant temperature, such that the only transient consideration that needs to be given is that of the warming of the cool air with time.

With any of the above approaches, it is important that the prior temperature component, whether it is the coil 11 or the air, remains below the critical melting or middle metallargical transformation point of the heat exchanger base metal.

A non-reflective, high absorbance black surface screen or booth 17 may be placed around the coil to reduce error that may be caused by reflections from other surrounding structures.

Referring now to FIG. 3, there are shown four sequential views of the graphic display resulting from a leak test in accordance with the above mentioned process. The respective times of the various images are shown in the lower left, whereas the temperature color scale is shown at the right. It will thus be seen that a complete sequence from frame 1 to frame 4 occurs in about seven seconds. During that time, the color difference resulting from temperature gradient changes from a maximum in frame 1 to a minimum in frame 4. That is, in frame 1, the coil is bright colored and the leakage location is dark colored. As the coil cools down and the air heats up, the color differences tend to fade as we proceed from frames 2–4. It therefore be seen that, with such a transient operation, it is important to use the images and analyze the data during the early portions of the transient cycle.

Although the images are shown in black and white, the imaging equipment that is available for display of the data in the manner described hereinabove is quite capable of displaying the test results in color, with cooler temperatures being shown in blue and the warmer temperatures being shown in colors on the other side of the spectrum such as yellow or white. Such a colored display therefore provides more flexibility and capability for analysis.

While some of the variables that must be considered in the calibration of the present system were discussed hereinabove, there are other variables that will affect the expected temperature curves of the fluid and the surface of the heat exchanger as follow:

1. Physical variables such as air flow, initial air temperature, air humidity content (best if dried), initial coil surface temperature, ambient air temperature, air pressure, leak size, and number of leak points.
2. Coil surface radiation, absorption, and thermal conductive properties.
3. Distance of coil to black body screen, as well as absorption surface properties of the materials that the black body screen is made of; and
4. Ability to physically isolate the test coil from light and heat sources; preferable to place it within a booth.

All of the above parameters come into play in defining the actual operational testing time interval. This interval is determined by fixing the following key variables:

1. Humidity content of trace air (preferable zero percent)
2. Air flow (determined by combining internal pressurization of coil which is a coil design known factor and the coil internal tube inside diameter);

3. Ambient temperature and humidity content controlled within the test booth; and
4. Scan path for the high arc camera (i.e., single pass, double pass etc.).

After these key variables have been established, a series of tests are then run to adjust the remaining parameters depending on the coil size. This would be done once per coil size only, and then the results would be stored in the control computer for further use during testing.

The time interval can be extended by maintaining the surface of the metal of the coil from achieving thermal equilibrium with the escaping, cooling air by providing some mechanism to prevent coil heating, such as the invective air flow system suggested above or the use of an ambient air blanket on the coil on all its surfaces expect the interrogated area. The larger the process time interval, the closer will the scan system to an on-line, real time imaging system that can provide a high degree of operator interaction and ability to manual interrogate areas during the test.

Figures 3, 4:
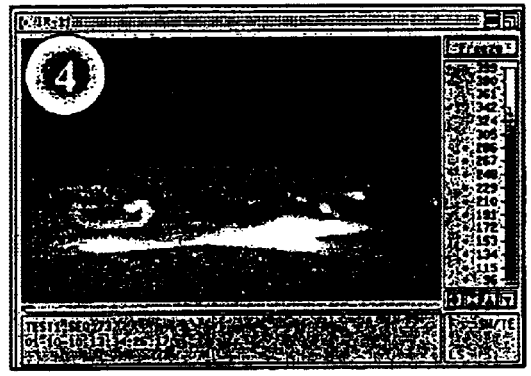
FIG. 4 is a process flow chart indicating the steps of the process in accordance with the preferred embodiment of the invention.
Figure 4:
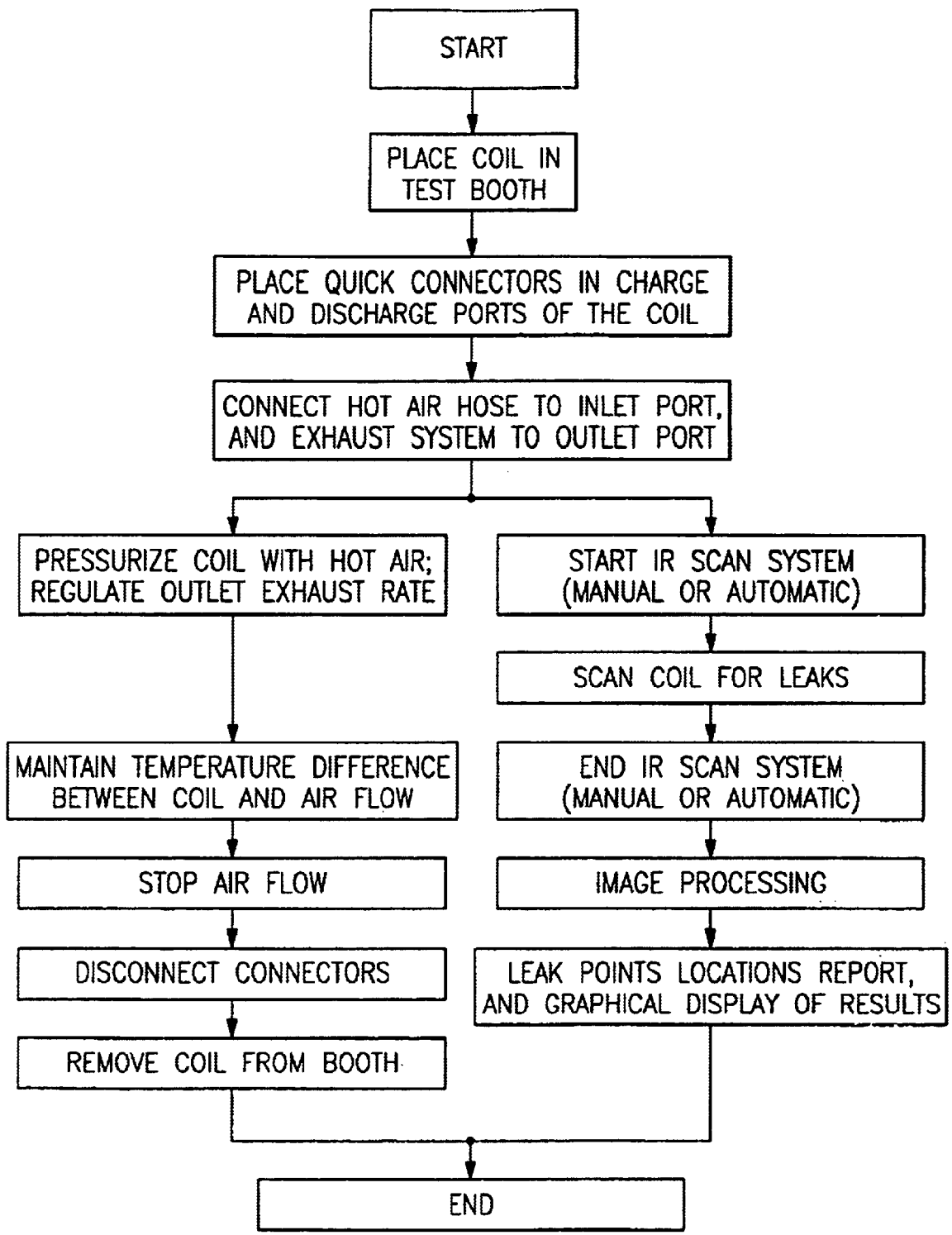

Referring now to FIG. 4, a typical flow chart is shown for the conduct of a leak test of a HVC coil. While this process shows the specific sequence of general and specific steps to be taken, it will be understood that the sequence and the particular steps can be substantially varied such as discussed hereinabove without departing from the true sprit of the present invention.

I claim:

1. A method of leak testing a heat exchanger of the type designed for the flow of refrigerant vapor therethrough, comprising the steps of:
   pressurizing the heat exchanger with a vapor,
   effecting a transfer of heat so as to cause a temperature gradient between the heat exchanger and the pressurized vapor therein;
   viewing the heat exchanger with an infrared camera and generating signals representative of the temperatures of both the heat exchanger and any vapor that is leaking therefrom; and
   applying said representative signals to an imaging system to create images that indicate the presence or absence of any vapor leakages from the heat exchanger.

2. A method as set forth in claim 1 wherein said vapor is ambient air.

3. A method as set forth in claim 1 wherein the step of effecting a transfer of heat is accomplished by adding heat to the heat exchanger.

4. A method of heat testing as set forth in claim 1 wherein the step of effecting the transfer of heat is accomplished by cooling the heat exchanger.

5. A method as set forth in claim 1 wherein the step of effecting a transfer of heat is accomplished by injecting heated vapor into the heat exchanger.

6. A method as set forth in claim 1 wherein the step of effecting a transfer of heat is accomplished by injecting cooled air into the heat exchanger.

7. A method as set forth in claim 1 and including a further step of positioning a black body behind the heat exchanger during the imaging process so as to eliminate errors that might otherwise occur from the reflection of light.

8. A method as set forth in claim 1 and including the further step of storing the representative signals for future use.

9. A method as set forth in claim 1 and including the further step of processing the representative signals by a computer for feedback to peripheral equipment for purposes of quality control.

10. A system for leak testing a heat exchanger of the type intended for conducting the flow of refrigerant vapor therethrough, comprising:
    means for pressurizing the heat exchanger with a gas;
    means for effecting a temperature gradient between the heat exchanger and the pressurized gas therein;
    an infrared camera for viewing selected areas of the pressurized heat exchanger for the purpose of generating signals representative of the respective temperatures of the heat exchanger and any gas leaking therefrom; and
    an imaging system for receiving such generated signals and for responsively constructing an image representative of said respective temperatures.

11. A system as set forth in claim 10 wherein said pressurizing means is a pump.

12. A system as set forth in claim 10 wherein said gas is ambient air.

13. A system as set forth in claim 10 wherein said means for effecting a temperature gradient comprises a means for heating the gas prior to the pressurizing step.

14. A system as set forth in claim 10 wherein said means for effecting a temperature gradient comprises means for cooling the gas prior to the pressurizing step.

15. A system as set forth in claim 10 wherein said means for effecting a temperature gradient comprises means for heating the heat exchanger.

16. A system as set forth in claim 10 wherein said means for effecting a temperature gradient comprises means for cooling the heat exchanger.

17. A system as set forth in claim 10 wherein said imaging system is capable of constructing a multiple color image with the colors being representative of the respective temperatures.

18. A system as set forth in claim 10 and including means for applying said generated signals to a data processor for providing respective feedback signals for purposes of quality control.

* * * * *